United States Patent [19]
Moser

[11] Patent Number: 5,865,244
[45] Date of Patent: Feb. 2, 1999

[54] PLASTIC HEADER TANK MATRIX AND METHOD OF MAKING SAME

[75] Inventor: George Moser, Wixon, Mich.

[73] Assignee: Behr America, Inc., Charleston, S.C.

[21] Appl. No.: 828,756

[22] Filed: Mar. 25, 1997

[51] Int. Cl.⁶ .................................................. F28F 9/16
[52] U.S. Cl. ............... 165/173; 165/905; 165/DIG. 492; 29/890.052
[58] Field of Search ................ 165/79, 173; 29/890.043, 29/890.052

[56] References Cited

U.S. PATENT DOCUMENTS

| | | | |
|---|---|---|---|
| 3,633,660 | 1/1972 | Young | 165/69 |
| 3,993,126 | 11/1976 | Taylor | 165/173 |
| 4,066,122 | 1/1978 | Gross et al. | |
| 4,117,884 | 10/1978 | Frei | 165/175 |
| 4,142,581 | 3/1979 | Yoshitomi et al. | 165/173 |
| 4,323,115 | 4/1982 | Stafford et al. | 165/79 |
| 4,576,223 | 3/1986 | Humpolik et al. | |
| 4,741,394 | 5/1988 | Tanigawa et al. | |
| 5,107,924 | 4/1992 | Herbert et al. | |
| 5,182,856 | 2/1993 | Armbruster | |

FOREIGN PATENT DOCUMENTS

| | | | |
|---|---|---|---|
| 1688103 | 10/1991 | U.S.S.R. | 165/79 |

*Primary Examiner*—Allen Flanigan
*Attorney, Agent, or Firm*—Howard & Howard

[57] ABSTRACT

A heat exchanger assembly (10) for transferring heat comprising a heat exchanger core (12) having adjacent hollow tubes (14), heat exchanger fins (16) interconnecting adjacent tubes (14), and a plastic header (18, 118) molded about each of the ends of the tubes (14). A cover (22, 122) at the top and bottom of the heat exchanger core (12) attaches to each of the headers (18, 118) about the ends of the tubes (14) to enclose the tank. The invention includes a method for making the heat exchanger assembly (10) by molding the plastic header (18, 118) about each of the ends of the hollow tubes (14).

6 Claims, 3 Drawing Sheets

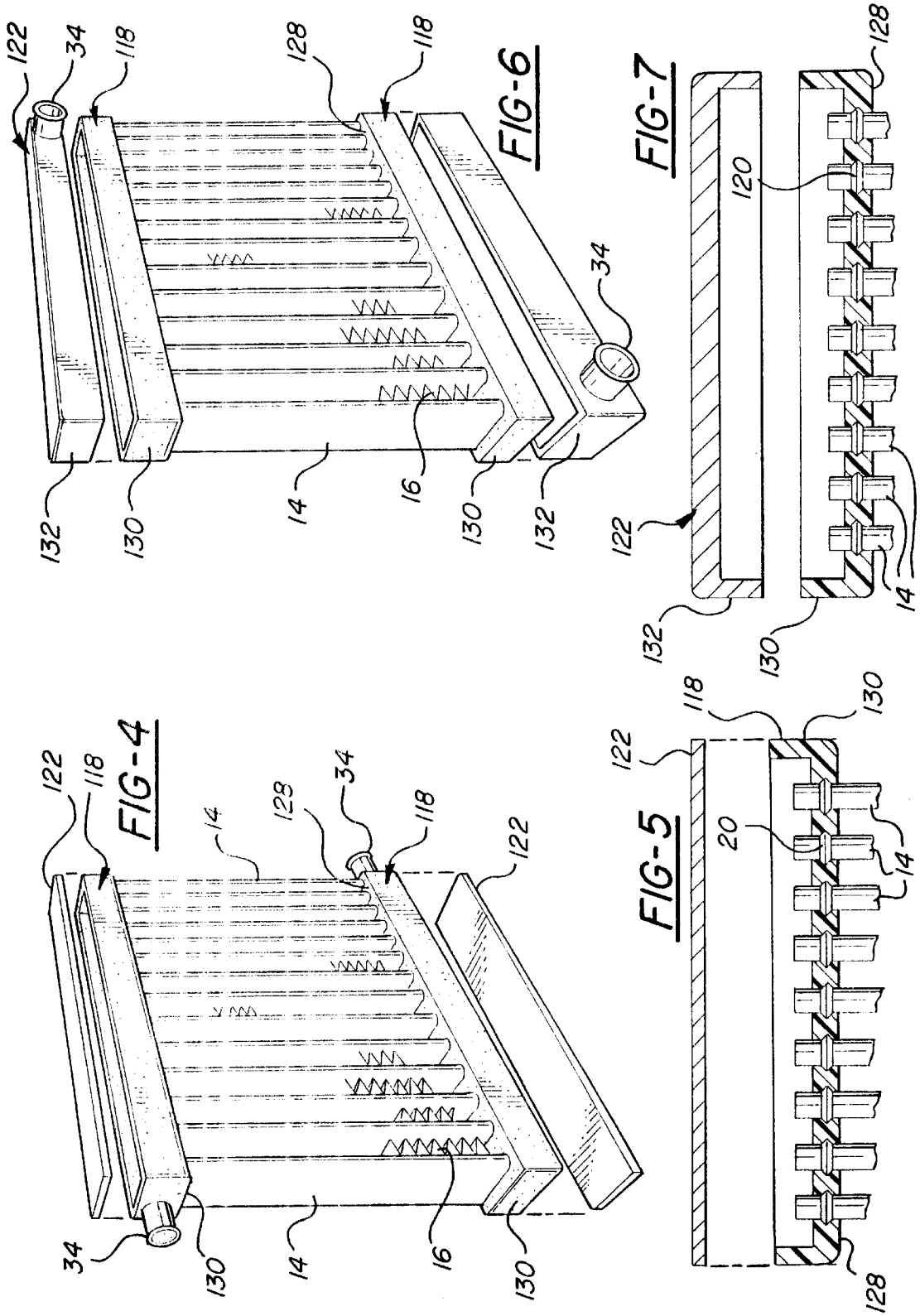

PLASTIC HEADER TANK MATRIX AND METHOD OF MAKING SAME

TECHNICAL FIELD

This invention relates to a heat exchanger assembly of the type for transferring heat between a liquid and ambient air and method of making the same.

BACKGROUND OF THE INVENTION

The object of a heat exchanger assembly is to maximize heat transfer efficiency at the lowest possible manufacturing cost. The object of the present invention is to prevent leaks caused by stress and cracks created as a result of assembling the components of the heat exchanger assembly. Such heat exchangers include adjacent hollow tubes interconnected by heat exchanger fins. The tubes have top ends and bottom ends that attach to header plates. A cover attaches to each of the header plates attached to the ends of the tubes to form a tank for holding liquid to be cooled in the heat exchanger assembly. The prior art heat exchanger has not provided for bonding a plastic header to the tubes to prevent leaks with ease and economical fabrication.

Typically, the header plates and tubes are made of some form of metal such as brass. They are bonded together by a brazing process in an oven. This method is disclosed in U.S. Pat. No. 4,741,394. In the prior art, methods for bonding a plastic header plate to another plastic component of the heat exchanger are disclosed. For example, U.S. Pat. No. 5,182,856 discloses a heat exchanger having disk oil coolers surrounded by a plastic covering that is welded to a plastic lid. Another example includes U.S. Pat. No. 4,066,122 in which the entire radiator consists of plastic material and the plastic components of the radiator are welded together after being fastened together with straps. Further, U.S. Pat. Nos. 4,565,223 and 5,107,924 disclose methods of joining the plastic header plate with a plastic water tank.

SUMMARY OF THE INVENTION AND ADVANTAGES

A heat exchanger assembly comprising a heat exchanger core having adjacent hollow tubes and heat exchanger fins interconnecting the adjacent tubes, each of the tubes having a top end and a bottom end; a header surrounding the top ends and the bottom ends of each of the tubes of the core, a cover attached to each of the headers to form an enclosed tank about the respective top ends and bottom ends of the tubes; the assembly is characterized by at least one of the headers being plastic and molded in sealing engagement about one of the ends of the tubes.

The invention includes a method of making the heat exchanger by molding at least one of the header tanks in sealing engagement about one of said ends of said tubes. Accordingly, the subject invention provides a heat exchanger having a plastic header that is sealed to prevent cracks and stress that cause leaks and that is easily and economically fabricated. The prior art methods and assemblies fail to address the need to bond the plastic header to the cover and the tubes of the heat exchanger unit.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 4–7 illustrate additional embodiments of the subject invention.

DETAILED DESCRIPTION OF THE PREFERRED EMBODIMENT

Figure 1:
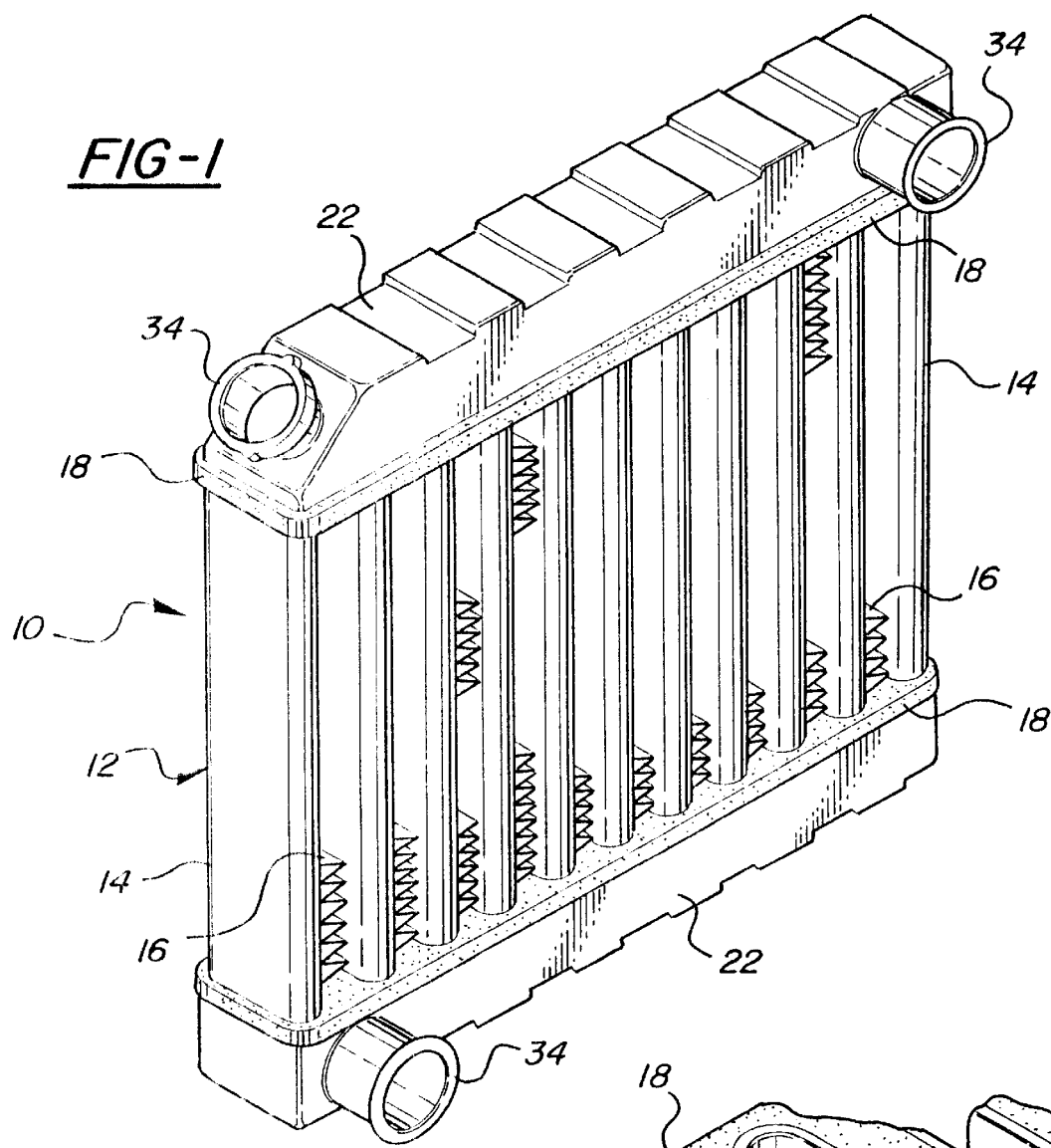
FIG. 1 is a perspective view of a heat exchanger constructed in accordance with the subject invention.
Figure 2:
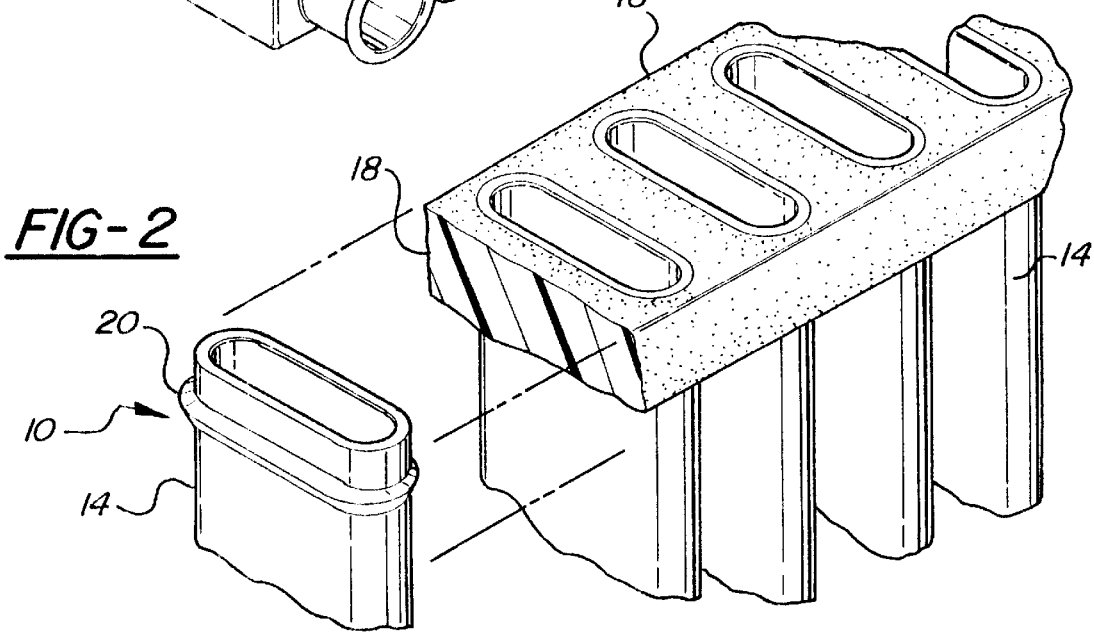
FIG. 2 is an enlarged perspective and fragmentary view of the header plate of the invention.

Referring to the Figures, wherein like numerals indicate like or corresponding parts throughout the several views, a heat exchanger assembly for transferring heat of a liquid is generally shown at 10.

The assembly 10 comprises a heat exchanger core generally indicated at 12 having adjacent hollow tubes 14 and heat exchanger fins 16 interconnecting the adjacent tubes 14, each of the tubes 14 having a top end and a bottom end. The bottom ends and top ends of each of the tubes 14 are surrounded by a header 18; i.e., one header 18 surrounds the top ends and another header 18 surrounds the bottom ends of each of the tubes 14 of the core 12. A mechanical lock 20 is disposed on each of the tubes 14 adjacent each end for mechanical interlocking engagement with the plastic header 18. More specifically, the mechanical lock 20 comprises an annular ring disposed about each of the tubes 14 for securing the engagement between the header 18 and the tubes 14. The plastic header 18 is molded about the mechanical lock 20 on the tube to engage the plastic header 18 in a mechanical interlocking fashion with each of the tubes 14. The assembly is characterized by the header 18 being plastic and being molded in situ in sealing engagement about each of the top ends and the bottom ends of the tubes 14.

To complete the heat exchanger, a cover 22 is attached to each of the headers 18 to form an enclosed tank about the top ends and bottom ends of the tubes 14, respectively. The covers 22 are also plastic and are welded, glued or otherwise diffused with the plastic of the headers 18. The tanks at the ends of the tubes 14 circulate liquid through the tubes 14 for transferring heat between the liquid and ambient air. The liquid is cooled by the process of heat transfer with the fins 16 that takes place as the liquid passes through the tubes 14 of the heat exchanger core 12.

Figure 3:
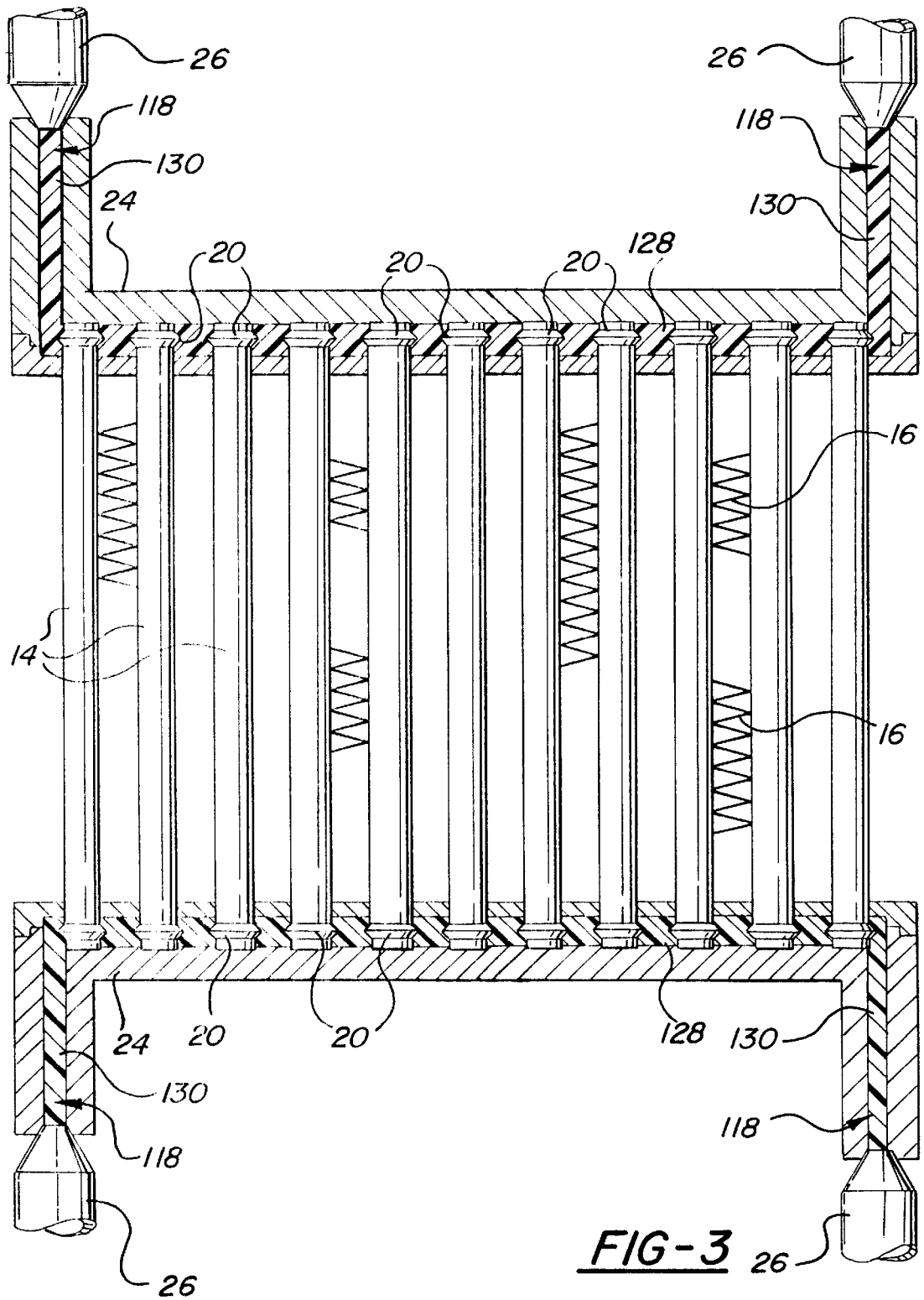
FIG. 3 is a side elevational view, partially in cross-section of the molding step.

The method of making the heat exchanger and another embodiment of the present invention is illustrated in FIG. 3. The method includes the step of molding the plastic headers generally indicated at 118 in sealing engagement about the ends of the tubes 14. However, before molding the header 118, a mechanical lock 20 is formed on each end of each of the tubes 14. More specifically, this step comprises forming an annular ring as the mechanical lock 20.

The ends of the tubes 14 and the annular rings 20 are disposed in plastic molds 24 which cover the open ends of the tubes 14. Plastic material is injected through the injectors 26 and into the cavities of the molds 24 to surround the end of each tube 14. The plastic header 118 is molded about the rings 20 and the tubes 14 such that there is a mechanical interlocking engagement between the tubes 14 and the plastic header 118. The annular rings 20 are brazed, soldered, or otherwise secured about each of the tubes 14 to retain the tubes 14 in the plastic header 118 in a mechanical interlocking fashion. In order to hold the liquid to be cooled, the method includes the step of attaching a cover 122 to each of the plastic headers 118 to define a tank about the respective top ends and bottom ends of the tubes 14. The enclosed tank has ports for entry and exit of the liquid to be cooled into and out of the heat exchanger core 12.

Another embodiment of the present invention is further illustrated in FIGS. 4 and 5 and includes the plastic header generally indicated at 118. The plastic header 118 differs only in the header 118 having a bottom portion 128 and a wall 130. The wall 130 extends upwardly from the bottom portion 128 about the periphery thereof to an upper rim. The cover 122 is a lid attached to the rim of the headers 118 to enclose the tank. The header 118 surrounds each of the top end and the bottom end of the tubes 14 with a cover 122 associated with each header 118.

Another embodiment is illustrated in FIGS. 6 and 7 and includes the cover generally indicated at 122. The only difference is that the cover 122 also includes a side wall 132. The wall 132 of the cover 122 has a lower rim that attaches to the upper rim of the header generally indicated at 118.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A heat exchanger assembly comprising:

a heat exchanger core (12) having adjacent hollow tubes (14) and heat exchanger fins (16) interconnecting said adjacent tubes (14), each of said tubes (14) having a top end and a bottom end;

a header (18) surrounding each of said top ends and said bottom ends of said tubes (14) of said core (12);

a cover (22) attached to each of said headers (18) to form a tank about said respective top ends and bottom ends of said tubes (14);

at least one of said headers (18) being plastic and molded in sealing engagement about one of said ends of said tubes (14);

said assembly characterized by an independent annular ring (20) disposed about each of said tubes (14) and said plastic header (18) is molded into mechanical interlocking engagement with said annular ring (20).

2. A heat exchanger assembly comprising:

a heat exchanger core (12) having adjacent hollow tubes (14) and heat exchanger fins (16) interconnecting said adjacent tubes (14) each of said tubes (14) having a top end and a bottom end, a header (18) surrounding each of said top ends and said bottom ends of said tubes (14) of said core (12);

a cover (22) attached to each of said headers (18) to form a tank about said respective top ends and bottom ends of said tubes (14);

said assembly characterized by at least one of said headers (18) being plastic and molded in sealing engagement about one of said ends of said tubes (14);

said header (118) including a bottom portion (128) and a wall (130) extending from said bottom portion (128), and said cover (122) being attached to said header (118).

3. An assembly as set forth in claim 2 wherein said cover (122) includes a lid portion and a wall (132) extending from said lid portion, and said wall (132) is attached to said header (118).

4. A method of making a heat exchanger of the type having a heat exchanger core (12) having adjacent hollow tubes (14) and heat exchanger fins (16) interconnecting said adjacent tubes (14), each of said tubes (14) having a top end and a bottom end, and a plastic header (18) surrounding each of said top ends and said bottom ends of said tubes (14) of said core (12), and said method comprising the steps of placing an independent annular ring (20) about each of the tubes (14) and molding at least one of said headers (18) in mechanical interlocking engagement with the rings (20) and in sealing engagement about one of said ends of said tubes (14).

5. A method of making a heat exchanger of the type having a heat exchanger core (12) having adjacent hollow tubes (14) and heat exchanger fins (16) interconnecting said adjacent tubes (14) each of said tubes (14) having a top end and a bottom end, and a plastic header (18) surrounding each of said top ends and said bottom ends of said tubes (14) of said core (12), and said method comprising the steps of molding at least one of said headers (18) in sealing engagement about one of said ends of said tubes (14); molding said plastic header (118) having a bottom portion (128) and a wall (130) extending from said bottom portion (128), and attaching said cover (122) to each of said headers (118) to enclose said headers (118) about said respective top ends and bottom ends of said tubes (14).

6. A method as set forth in claim 5 further defined as attaching said cover (122) including a lid portion and a wall (132) extending from said lid portion to each of said headers (118) to enclose said headers (118) about said respective top ends and bottom ends of said tubes (14).

* * * * *